United States Patent [19]
Sarto

[11] 3,817,230
[45] June 18, 1974

[54] EXHAUST RECIRCULATION

[75] Inventor: Jorma O. Sarto, Orchard Lake, Mich.

[73] Assignee: Chrysler Corporation, Highland Park, Mich.

[22] Filed: Sept. 21, 1972

[21] Appl. No.: 291,130

[52] U.S. Cl. .............................................. 123/119 A
[51] Int. Cl. ...................................... F02m 25/06
[58] Field of Search ................................. 123/119 A

[56] References Cited
UNITED STATES PATENTS

| | | | |
|---|---|---|---|
| 2,087,116 | 7/1937 | Prentiss | 123/119 A |
| 2,287,593 | 6/1942 | Ball | 123/119 A |
| 3,019,780 | 2/1962 | Nuding | 123/119 A |
| 3,116,725 | 1/1964 | Hadley | 123/119 A |
| 3,717,131 | 2/1973 | Chana et al. | 123/119 A |

*Primary Examiner*—Wendell E. Burns
*Attorney, Agent, or Firm*—Talburtt & Baldwin

[57] ABSTRACT

Automobile exhaust gases are recycled by means of a swirl chamber which receives these gases at a restricted opening in an upstream end located within the environment of the hot gases of the exhaust system. The chamber is in heat exchange relationship with the conventional intake manifold hot spot to facilitate heating of the latter. The chamber discharges the hot exhaust gases at a restricted opening in a downstream end and in opposition to the inlet flow of the fuel-air mixture at a location directly below the throttle valve. A second restricted duct opens into the induction conduit upstream of the throttle valve to receive inlet gases during idle and discharges tangentially into the swirl chamber to effect a swirling gas motion therein to inhibit exhaust flow therethrough during engine idle operation. The downstream end of the chamber comprises a thin plate adapted to flex with changing operating temperatures to dislodge exhaust gas contaminants from adjacent its opening.

11 Claims, 2 Drawing Figures

EXHAUST RECIRCULATION

BACKGROUND AND SUMMARY OF THE INVENTION

In the prior art, numerous systems have been devised to recycle exhaust gas into the fuel-air induction system of an automobile engine for the purposes of pre-heating and vaporizing the incoming air-fuel mixture to facilitate its complete combustion in the combustion zone, for re-using the unignited or partially burned portions of the fuel which would otherwise pass out the exhaust pipe and into the atmosphere, and for reducing the oxides of nitrogen ($NO_x$) emitted from the exhaust system into the atmosphere. It has been found that approximately 15 percent exhaust gas recycling is required at moderate engine loads to substantially reduce the nitrogen oxide content of the exhaust gases discharged in the atmosphere.

Although the prior art structures have had the desired effect of reducing the content of nitrogen oxides in the exhaust by reducing the maximum combustion temperature in consequence of diluting the fuel-air mixture with recycled exhaust gases during certain operating conditions of the engine, these structures have been undesirable from the standpoint of both cost and operating efficiency and have been complicated by the desirability of reducing the recycling during conditions of both engine idling when nitrogen oxide emission is a minor problem and wide open throttle when maximum power is required, while progressively increasing the recycling of exhaust gases with increasing engine speed during cruising condition or with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1,200°F. The formation of nitrogen oxides does not become particularly objectionable until the combustion temperature exceeds about 2,200°F., but the usual engine combustion temperature which increases with engine load or the rate of acceleration at any given speed frequently rises to about 2,500°F. It is known that the recycling of at least 1/20th and not more than ¼ of the total exhaust gases through the engine, depending on the load or power demand, will reduce the combustion temperature to less than 2,200°F. The desired result is usually obtained with the ordinary engine upon the recycling of about 15 percent of the total exhaust gases during partially open throttle as aforesaid.

An important object of this invention is to provide improved means uncomplicated by moving parts comprising a restricted recycling duct for recirculating a portion of the combustion products from the exhaust system to the inlet system of an automobile engine to overcome or avoid the problems and deficiencies of the prior art, as well as to achieve a number of important results including preheating and improved mixing and carburetion of the fuel-air mixture in the inlet header and the reduction of nitrogen oxides in the exhaust.

Another and more specific object is to provide such an exhaust recycling system wherein the upstream restriction for the recycling duct is adjacent the latter's upstream end within the environment of the hot exhaust gases at temperatures appreciably greater than 700°F. and spaced from the hot spot to minimize heat loss thereto. Such a construction is particularly suitable for use with fuels containing lead additives to improve combustion characteristics.

The resulting lead oxides in the exhaust exist in a vapor phase at temperatures above approximately 700°F. The latter temperature is well below the exhaust temperature available but is somewhat higher than the usual temperature of the hot spot, which is continually cooled by impingement of the comparatively cold inlet fuel and air mixture and the vaporization of liquid fuel droplets within the mixture. By locating the upstream recycling restriction within the environment of the hot exhaust gases, the temperature of the latter restriction will preferably be maintained above 800°F. and the exhaust gases containing lead oxide vapors will pass readily through the hot restriction without condensing thereat. If any lead oxides do condense and deposit within a cooler downstream portion of the bypass duct, these deposits will be within an enlarged portion of the recycling duct and will be relatively harmless. The downstream restriction of the recycling duct will be a comparatively large port capable of freely allowing passage of exhaust particulates, if any.

The aforesaid upstream and downstream restrictions are openings provided in comparatively thin plates comprising opposite endwalls of a cylindrical swirl chamber enlargement within the recycling duct. The endwalls are adapted to flex with changing operating temperatures to dislodge contaminants, if any, within the exhaust gases that might otherwise tend to collect around and clog the restricted openings, especially at the cooler downstream endwall.

Exhaust flow through the recycling duct is materially reduced or retarded during engine idle operation by means of an idle exhaust recycling inhibitor duct, comprising a second restricted duct which connects the carburetor inlet induction conduit upstream of the usual throttle valve with the swirl chamber between its endwalls, thereby to prevent any substantial pressure differential across the latter restriction during idle operation. Preferably the restricted endwall openings are coaxial with the cylinder axis of the swirl chamber and the inhibitor duct opens into the cylindrical sidewall of the swirl chamber generally tangentially to impart a swirling motion to the gases in the swirl chamber. Thus the total pressure within the swirl chamber will be increased with respect to the pressure that would exist without the swirling motion and the maximum static pressure will exist along the axis of the swirl, whereby the inhibition of exhaust gas flow into the swirl chamber from the exhaust header will be enhanced, or in the alternative, for the same inhibition of exhaust recycling that would exist without the swirl, the size of the restricted end openings may be increased.

It is apparent that the swirl chamber enables a more versatile control over the exhaust gas recycling. In the usual instance, a compromise is reached between increased inhibition of the exhaust recycling at idle and an increase in the size of the restricted downstream end opening with respect to the upstream end opening, whereby the upstream restricted opening becomes the primary metering restriction for controlling the exhaust recycling and the larger downstream opening becomes less susceptible to being clogged by exhaust contaminants.

By virtue of the foregoing, communication will exist at all times between the exhaust and inlet systems but recycling of the hot exhaust gases will be reduced during idle operation. The downstream opening of the recycling duct opposing the flow of the inlet mixture will be shielded by the throttle valve when the latter is partly open, but will be exposed in the manner of a pitot opening to approximately the full velocity pressure of the inlet mixture at wide open throttle, whereby the proportion of the bypass flow relative to the total inlet air flow may be effectively reduced at wide open throttle. Also the high temperature of the exhaust at wide open throttle tends to reduce the exhaust density as compared to the lower temperatures during moderate acceleration, so that the effective exhaust recycling at wide open throttle is less than it would be otherwise. By suitably determining the size of the various restrictions, the recycling flow will be contained approximately within the limits of more than 5 percent and less than 25 percent, and usually about 15 percent of the total exhaust gases when the throttle is partially open and the effective pressure differential between the ends of the recycling duct corresponds to cruising or part throttle acceleration conditions. Exhaust gas recycling greater than 25 percent tends to reduce $NO_x$ formation but interferes with engine drivability.

Within the range from idle to light or moderate load conditions, the total fluid flow through fixed recycling orifices of the type comprising the present invention increases at any given engine speed with increasing engine load. For example, in a conventional automobile engine, the pressure downstream of the throttle varies roughly in the neighborhood of from one half atmosphere during idling to approximately one atmosphere at wide open throttle, while the exhaust pressure simultaneously varies roughly from one to two atmospheres. These factors compensate for the increasing combustion temperature with increasing load and result in a desirable increase in the effectiveness of the exhaust recycling through the fixed recycling restrictions with increasing load or acceleration.

In addition, the end of the second restricted or inhibitor duct upstream of the throttle valve opens adjacent and upstream of the leading edge of a conventional pivotal blade or butterfly-type throttle valve when the latter is at its closed or idle position, such that on partial opening of the throttle valve to a part load position, the leading edge of the throttle valve will swing to a position upstream of the adjacent opening of the inhibitor duct. In consequence the pressure at the latter opening will drop rapidly. Simultaneously the exhaust pressure will increase with increasing load, so that the pressure differential causing inlet gas flow through the inhibitor duct into the recycling duct will decrease, the inhibition of exhasut recycling flow through the recycling duct will decrease, and the exhaust recycling flow will increase to the desired extent, depending upon the sizes of the restrictions and the engine operating characteristics. In fact, as the throttle continues to open, the exhaust pressure within the recycling duct eventually will usually exceed the inlet gas pressure at the leading edge of the throttle valve and a reverse flow through the inhibitor duct will occur to increase the exhaust recycling with increasing load.

As the engine load or acceleration decreases and the speed increases to the cruising condition, the combustion temperature and the pressure differential across the recycling duct decrease, as does also the total quantity of exhaust gases and the pressure at the upstream end of the inhibitor duct located downstream of the partially open throttle. Thus the rate of exhaust recycling declines for improved fuel economy, again as desired because less recycling is required to maintain the combustion temperature below the level at which nitrogen oxide formation is objectionable.

As the pressure differential between the inlet and exhaust headers increases with increasing load, the effective resistance of the fixed restrictions to the exhaust recycling flow increases because the flow rate through the recycling duct varies approximately as the square root of the pressure differential. Thus at wide open throttle the proportion of the total exhaust gases that is recycled is somewhat less than the proportion recycled at partially open throttle. This factor also is as desired because the customary excess fuel enrichment at wide open throttle in cooperation with the recycled exhaust gases is adequate to prevent overheating during the combustion process and reduce the formation of nitrogen oxides to the tolerable level.

Other objects of this invention will appear in the following description and appended claims, reference being had to the accompanying drawings forming a part of this specification wherein like reference characters designate corresponding parts in the several views.

DESCRIPTION OF A PREFERRED EMBODIMENT

Figure 1:
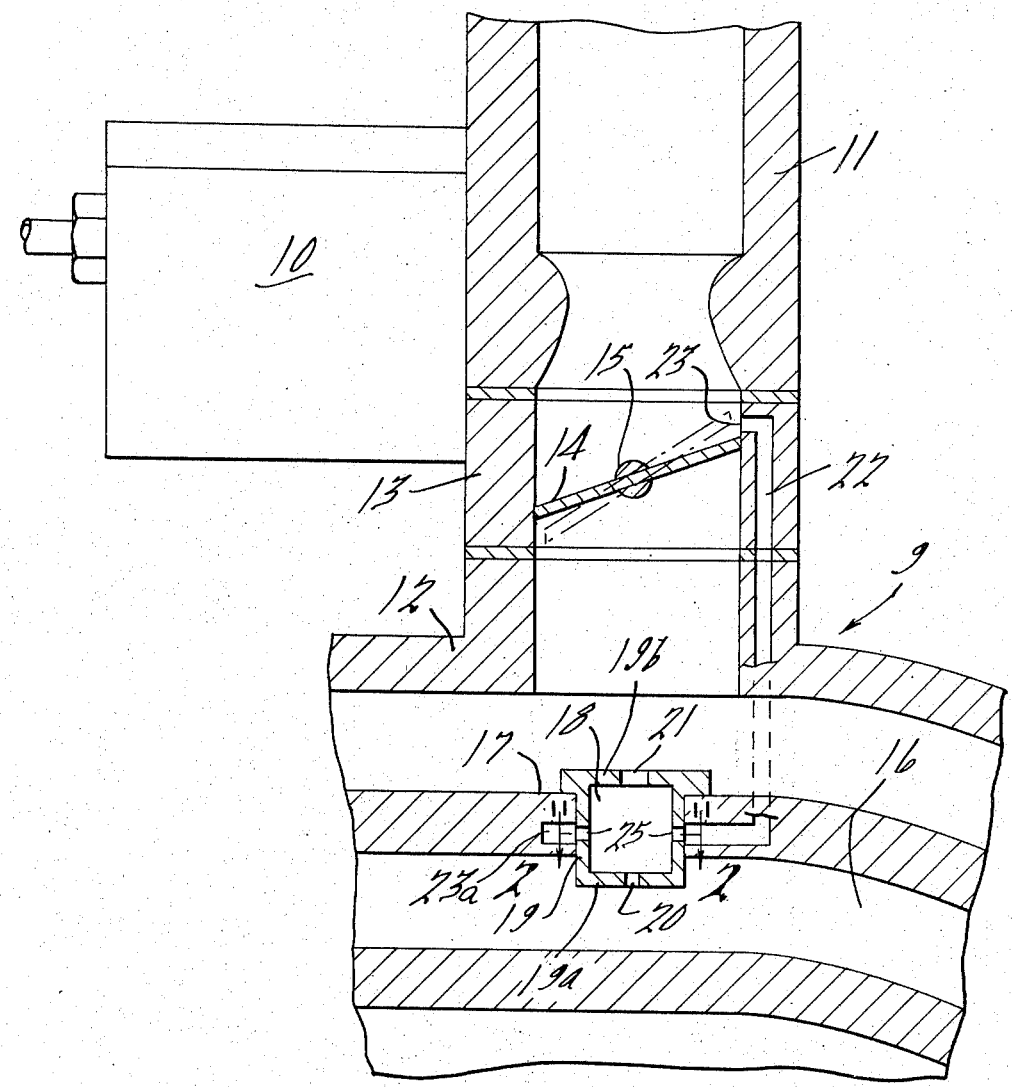
FIG. 1 is a schematic fragmentary cross sectional view through an automobile engine induction system showing a system embodying the present invention for recycling exhaust gases.

An application of the present invention is illustrated by way of example with an automobile engine 9 having a carburetor 10 providing the inlet fuel-air induction conduit 11, which comprises the upstream portion of an inlet header 12 for supplying a combustible fuel fuel and air mixture to the engine cylinders. The carburetor 10 may comprise any conventional type which has the usual air inlet at the upstream end of the induction conduit 11, the usual fuel metering system and nozzles or jets for supplying idle and operating fuel to the conduit 11 during various operating conditions and for enriching the fuel supply during acceleration and wide open throttle. An example of such a carburetor is illustrated by way of example in Ball U.S. Pat. No. 2,966,344, which is incorporated herein by reference.

The downstream portion of the induction conduit 11 comprises the customary throttle body 13 containing the conventional butterfly type throttle valve 14 pivotal at 15. The inlet fuel-air mixture is conducted via the header or manifold 12 to the engine cylinders. After combustion of the fuel-air mixture in the engine cylinders, the exhaust gases are discharged through a muffler to the atmosphere.

Usually left and right exhaust manifolds are connected by an exhaust crossover conduit 16 which conducts the hot exhaust gases into heat exchange relationship with a portion 17 of the wall of the inlet header 12.

The wall portion 17 extends transversely to the direction of flow of the inlet mixture and is commonly referred to as the "hot spot" which preheats the inlet mixture and enhances vaporization and mixing of liquid fuel droplets.

The structure described thus far may also be conventional, as illustrated in Sarto U.S. Pat. No. 3,646,923, which is incorporated herein by reference.

Associated with the throttle valve 14 and located within the hot spot 17 is a cylindrical swirl chamber 18 comprising part of a restricted exhaust recycling duct 19 which has an upstream orifice or restriction 20 at its lower end opening within the interior of conduit 16 at a location spaced inwardly from the adjacent inner wall surface. Thus non-gaseous combustion products cannot readily enter and accumulate within the restriction 20 and clog the recycling system. Where the exhaust contains appreciable quantities of materials that tend to form gummy residues upon cooling, as for example, in giving up heat to the hot spot 17, these residues have less tendency to deposit within the hot passage 16 than in the cooler upon portion of the duct 19 which is cooled by the inlet fuel and air mixture. In fact such materials including lead additives will usually pass freely in a gaseous state through restriction 20. The upper end of duct 19 discharges through a downstream restriction or orifice 21 into the header 12 directly below valve 14 and in opposition to the inlet fuel-air flow to warm the latter and to facilitate mixing and vaporization of the fuel within the inlet air. The openings 20 and 21 are provided coaxially in comparatively thin end plates 19a and 19b of the chamber 18 which plates may be approximately 0.02 inches thick so as to flex readily with changing operating temperatures and crack off exhaust gas deposits such as precipitated lead oxides that might otherwise collect around and clog the opening 21. Also the rate of heat transfer from the sharp orifices 20 and 21 defined by the thin plates 19a and 19b is reduced, as compared to the heat transfer from formed or more streamlined orifices, so that the plates 19a and 19b at the regions of the orifices are hotter than would otherwise be the case and the precipitation of contaminants adjacent the orifices is discouraged.

In order to inhibit exhaust flow through restricted orifice 20 during idle operation of the engine when the throttle valve 14 is at the idle position shown by solid lines, the nearly atmospheric inlet pressure above the valve 14 is communicated to chamber 18 via a second restricted or exhaust flow inhibitor duct 22. The latter extends within the sidewall of the inlet header 12 from a port 23, which opens into header 12 adjacent and upstream of the upper leading edge of valve 14 when the latter is at the idle position shown, and opens at its lower end into an annular duct 23 which extends coaxially around the duct 19 and communicates with a plurality of restricted orifices 25 extending somewhat tangentially through the walls of duct 19 into chamber 18 at locations between the restrictions 20 and 21. In consequence during idle operation, only a comparatively small pressure differential will exist across restriction 20 because the exhaust pressure in passage 16 will only be slightly greater than atmospheric during idle. The actual pressure differential will be determined by the sizes of the orifices 20, 21 and 25.

Figure 2:
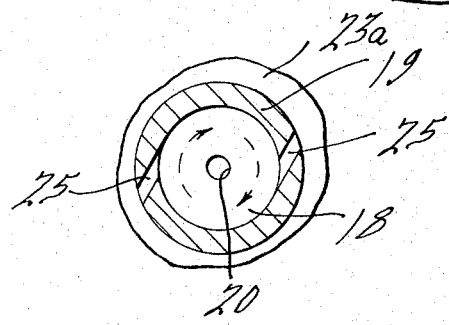
FIG. 2 is a fragmentary sectional view taken in the direction of the arrows substantially along the line 2—2 of FIG. 1.

By virtue of the tangential arrangement of the restricted orifices 25, a swirling motion about the axis of chamber 18 will be imparted to the inlet gases entering chamber 18, as indicated by the dotted arrows, FIG. 2, to induce a greater flow into chamber 18 through inhibitor duct 22 and greater static pressure at the axis of the swirl, i.e., the axis of chamber 18, then would otherwise exist. Optimum inhibition of exhaust flow into chamber 18 via restricted opening 20 located on the swirl axis is thus accomplished and, for any desired exhaust flow rate at idle, the size of openings 20 and 21 may be larger than would otherwise be possible without the swirl. In consequence during open throttle operation the resistance to exhasut recycling is decreased and during all operating conditions the tendency to clog the restricted openings 20 and 21 is minimized.

The orifices 25 are dimensioned so that the air flow through duct 22 into chamber 18 and thence into header 12 will amount to between approximately 50 percent and 80 percent of the desired idle air required to support combustion of idle fuel supplied by the customary idle fuel port 26. The remaining idle air will be supplied by leakage around the edges of the throttle valve 14 and via the usual idle fuel-air port in a partially atomized fuel-air mixture. The orifice 21 will be somewhat larger than orifice 20 and will be determined so that the exhaust recycling at idle will be reduced to a value in the neighborhood of 5 percent of the total exhaust and preferably less.

As the throttle valve 14 opens from the idle position shown in solid lines to the dotted position, the pressure at orifice 23 will fall rapidly and will approximate the pressure in header 12 adjacent orifice 21. The duct 22 will then have little inhibiting influence on the exhaust recycling flow, which flow will then be determined primarily by the pressure differential across orifice 20. Upon continued opening of the throttle 14, the exhaust pressure within chamber 18 will eventually exceed the inlet pressure at orifice 23 and the direction of flow in duct 22 will reverse. The exhaust recycling flow will then be proportioned between orifice 21 and duct 22 in accordance with their relative restrictions to effect a total exhaust recycling flow in the neighborhood of 15 percent of the total exhaust flow.

At wide open throttle, the upwardly directed orifice 21 will not be shielded by the throttle valve from the full blast of the inlet flow, so that the exhaust recycling through restriction 21 will be hampered by pitot action. This factor, in cooperation with the aforesaid flow relationshp proportional to the square root of the pressure differential across orifice 20 and the temperature-density relationship of the high temperature exhaust gas at wide open throttle will effect a reduction in the proportion of exhaust recycling through orifice 20 at wide open throttle, compared to the total exhaust flow, even though the total exhaust recycling will increase steadily as the throttle approaches the wide open condition.

I claim:

1. In an internal combustion engine,
   A. an inlet header for conducting a combustible fuel-air mixture into said engine,
   B. a throttle valve movable in said header between idle and open positions,
   C. an exhaust header for discharging combustion products from said engine, and
   D. means for recycling exhaust gases from said exhaust header to said inlet header as a function of engine operation to inhibit the formation of nitrogen oxides comprising recycling duct means including
1. a swirl chamber having
2. a restricted upstream opening communicating with said exhaust header to receive exhaust gases and
3. first and second restricted downstream openings communicating with said inlet header at locations downstream and upstream respectively of said throttle valve when the latter is at its idle position,
4. the restrictions for said openings being dimensioned with respect to each other to effect fluid flow from said inlet header into said chamber via said second downstream opening when said throttle valve is at its idle position, thereby to inhibit the flow of exhaust gases into said chamber via said upstream opening,
5. and means for imparting a swirl to the fluid within said chamber about an axis to enhance the inhibition of said flow of exhaust gases into said chamber via said upstream opening, the last named means including means cooperating with said second downstream opening for directing the fluid flow therethrough into said chamber generally tangentially to said swirl, said upstream opening being located adjacent said axis and said second restricted downstream opening being adjacent the periphery of said swirl.

2. In the combination according to claim 1, said last named means including said second downstream opening extending through the sidewall of said chamber in a direction having a tangential component with respect to said axis.

3. In the combination according to claim 2, said upstream opening and first downstream opening being located adjacent said axis at opposite ends of said chamber and said second downstream opening being located between said ends.

4. In the combination according to claim 2, the portion of said chamber containing said first downstream opening comprising a thin plate adapted to flex sufficiently with changing operating temperatures to dislodge exhaust gas contaminants.

5. In the combination according to claim 1, said throttle valve comprising a blade pivotal within said inlet header between said idle and open positions and having a leading upstream edge adjacent and downstream of the location of communication of said second downstream opening with said inlet header when said throttle valve is at its idle position and being adapted to swing upstream of the last named location upon predetermined opening of said throttle valve.

6. In the combination according to claim 5, the restrictions of said openings being dimensioned to effect a flow of exhaust gases into said inlet conduit through said second downstream opening upon predetermined opening of said throttle valve from its idle position.

7. In the combination according to claim 1, the restrictions of said openings being dimensioned to effect a flow of air from said inlet conduit through said second downstream opening amounting to between approximately 50 percent to 80 percent of the desired air for supporting idle combustion in said engine when said throttle valve is at its idle position.

8. In the combination according to claim 7, said restrictions being also dimensioned to effect a flow of exhaust gases into said inlet conduit through said second downstream opening upon predetermined opening of said throttle valve from its idle position.

9. In the combination according to claim 1, the restrictions of said openings being dimensioned to effect a flow of exhaust gases into said inlet conduit through said second downstream opening upon predetermined opening of said throttle valve from its idle position.

10. In the combination according to claim 1, said chamber being defined by a portion of the wall of said exhasut header extending transversely to the axis of said chamber and the flow path of said fuel-air mixture in said inlet header for impingement of said mixture against said wall portion, said upstream opening and first downstream opening being located adjacent said axis and spaced axially thereof, and said first downstream opening being directed to discharge gases from said chamber in opposition to said flow path.

11. In the combination according to claim 10, said upstream opening being located in an end wall of said chamber projecting into the exhasut gas flow within said exhaust header.

* * * * *